US007812937B2

(12) United States Patent
Hoshino et al.

(10) Patent No.: US 7,812,937 B2
(45) Date of Patent: Oct. 12, 2010

(54) IDENTIFICATION MEDIUM, ARTICLE, IDENTIFICATION DEVICE, AND METHOD OF IDENTIFYING IDENTIFICATION MEDIUM

(75) Inventors: Hidekazu Hoshino, Yokohama (JP); Itsuo Takeuchi, Yokohama (JP); Tokio Sakauchi, Yokohama (JP); Tohru Ida, Yokohama (JP); Shinya Nasubida, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 71 days.

(21) Appl. No.: 12/310,244

(22) PCT Filed: Aug. 23, 2007

(86) PCT No.: PCT/JP2007/066344

§ 371 (c)(1), (2), (4) Date: Feb. 18, 2009

(87) PCT Pub. No.: WO2008/026498

PCT Pub. Date: Mar. 6, 2008

(65) Prior Publication Data

US 2009/0323066 A1 Dec. 31, 2009

(30) Foreign Application Priority Data

Sep. 1, 2006 (JP) ............................ 2006-237305

(51) Int. Cl.
*G06K 9/74* (2006.01)

(52) U.S. Cl. ........................................................ 356/71

(58) Field of Classification Search .................. 356/71, 356/402
See application file for complete search history.

(56) References Cited

U.S. PATENT DOCUMENTS

2010/0102250 A1* 4/2010 Li et al. .................. 250/459.1

FOREIGN PATENT DOCUMENTS

| | | |
|---|---|---|
| EP | 0 435 029 A2 | 7/1991 |
| JP | A-63-51193 | 3/1988 |
| JP | A-4-144796 | 5/1992 |
| JP | A-10-268772 | 10/1998 |
| JP | A-11-216354 | 8/1999 |
| JP | A-2006-142576 | 6/2006 |
| JP | A-2006-178277 | 7/2006 |
| JP | A-2006-192799 | 7/2006 |

* cited by examiner

*Primary Examiner*—Roy Punnoose
(74) *Attorney, Agent, or Firm*—Oliff & Berridge, PLC

(57) ABSTRACT

An identifying medium comprises an optical functional layer that is optically identifiable and comprises a layer containing microcapsules. The microcapsule contains a material that occurs color change by breaking the microcapsule.

8 Claims, 4 Drawing Sheets

Under ordinary viewing condition

Observed through a left-handed circularly polarized light filter

Observed through a right-handed circularly polarized light filter

Under ordinary viewing condition

Observed through a left-handed circularly polarized light filter

Observed through a right-handed circularly polarized light filter

Under ordinary viewing condition

Observed through a left-handed circularly polarized light filter

Observed through a right-handed circularly polarized light filter

IDENTIFICATION MEDIUM, ARTICLE, IDENTIFICATION DEVICE, AND METHOD OF IDENTIFYING IDENTIFICATION MEDIUM

TECHNICAL FIELD

The present invention relates to an identifying medium that allows determination of whether or not articles are authentic by use of visual effects.

BACKGROUND ART

Identifying mediums using optical characteristics are known, and the color of the identifying medium may be varied by tilting, and a latent image may be viewed (or become invisible) in observation through a polarizing plate. The identifying medium may be used as a device for determining whether or not various kinds of articles are authentic, for example. As the identifying medium, for example, identifying mediums disclosed in Japanese Patent Application Laid-Open No. 63-51193 and Japanese Patent Application Laid-Open No. 4-144796 are known.

The identifying medium may be used by affixing it to an article to be identified. In this case, if the identifying medium that is affixed to an article can be easily peeled off, the identifying medium may be reused and be misused. Therefore, the identifying medium is affixed to the article by a special adhesive agent so that it cannot be easily peeled off. In addition, the identifying medium is formed with a feature such as a cut, so that the identifying medium will split if it is peeled off, in order that the identifying medium cannot easily be reused, while maintaining the prior condition.

In a case of an article (object to which an identifying medium is affixed) made of a liquid-penetrable material, when a certain kind of organic solvent penetrates into the article, the bonding strength of an adhesive agent is decreased. Therefore, there may be a case in which the identifying medium can be peeled off without breaking. In this case, the identifying medium can be reused and may be misused.

DISCLOSURE OF THE INVENTION

An object of the present invention is to provide a technique for preventing reuse of an identifying medium by marking a history of attempts to peel off the identifying medium that is affixed to an article by an adhesive agent.

The present invention provides an identifying medium including an optical functional layer that is optically identifiable and including a layer containing microcapsules, and the microcapsules contain a material that exhibits a color change by breaking the microcapsules. According to the present invention, when the identifying medium is being peeled off, the microcapsules are chemically or physically broken, whereby the color change occurs. Therefore, an identifying medium, in which signs of attempts to peel off the identifying medium are easily recognized, is obtained. The change in color includes a change from a colorless state to a colored state, a change from a colored state to a colorless state, and a change from a predetermined colored state to another colored state.

The identifying medium of the present invention desirably includes an adhesive layer, and the microcapsule is desirably made of a material that is soluble by a solvent which dissolves the adhesive layer or decreases adhesive strength of the adhesive layer. According to this structure, when an identifying medium that is affixed is being peeled off or is peeled off by dissolving the adhesive layer (or decreasing the adhesive strength) with a solvent, the microcapsules are dissolved, whereby the color change occurs. Thus, the optical characteristics (appearance) of the identifying medium are changed, and evidence for recognizing signs of attempts to peel off the identifying medium remains. Therefore, reuse of the identifying medium is prevented.

In a structure having the above adhesive layer, a layer containing the microcapsules is desirably provided adjacent to the adhesive layer, and the adhesive layer has an adhesive surface and is desirably formed with a path for liquid penetration from the adhesive surface to the layer containing the microcapsules. According to this structure, when the adhesive layer is being dissolved (or the adhesive strength is being decreased) by a solvent, the solvent penetrates into the layer containing the microcapsules, whereby the function of the microcapsules is effectively obtained.

In the present invention, the microcapsules desirably include first microcapsules containing a first raw material, and include second microcapsules containing a second raw material, and the color change desirably occurs by mixing the first and the second raw materials. In this case, two kinds of microcapsules containing different raw materials, which develop color by mixing them, are prepared, and a layer containing these microcapsules in a dispersed state is formed. In a condition in which the microcapsules are not broken, the color change does not occur, and the predetermined optical characteristics of the identifying medium can be used for identification. When the microcapsules come into contact with solvent that dissolves the adhesive layer, the microcapsules are broken, and two kinds of the raw materials are mixed. As a result, the color change occurs, which affects the optical characteristics of the identifying medium. Therefore, signs of attempts to peel off the identifying medium by solvent are easily recognized. That is, the history of improper acts obviously remains.

The microcapsules of the present invention may be prepared by various types of publicly known methods. In general, as a microcapsule production method, a chemical method using condensation polymerization and a physicochemical method such as a coacervation process, a drying-in-liquid process, and a melting dispersion and cooling process, may be mentioned. In addition, a mechanical method such as a pan coating process, an air suspending process, and a spray drying process, may also be used.

In the present invention, the optical functional layer is desirably made of a cholesteric liquid crystal layer or a multilayer film having plural light-transparent films that are laminated so that adjacent light-transparent films have different refractive indexes.

The cholesteric liquid crystal layer is a layer of liquid crystal that selectively reflects right-handed or left-handed circularly polarized light having a predetermined wavelength when natural light enters thereinto. The cholesteric liquid crystal layer has a laminated structure. In one layer, long axes of liquid crystal molecules have the same orientation and are parallel to the plane of the layer. The directions of the orientation slightly differ with respect to the adjacent layer, and the layers are stacked with the orientations rotating in a three-dimensional spiral structure overall. In this structure, in a direction perpendicular to the layer, pitch P is a distance necessary for the molecular long axis to be rotated through 360° and return to the initial state, and an average refraction index of the respective layers is index n. In this case, the cholesteric liquid crystal layer selectively reflects circularly polarized light having a predetermined circling direction and a center wavelength λs which satisfies the equation λs=n×P. That is, when white light, which has uniformly polarized components, enters into the cholesteric liquid crystal layer, right-handed or left-handed circularly polarized light having a predetermined center wavelength is selectively reflected. In this case, circularly polarized light having the same wavelength λs as the reflected circularly polarized light and having a reverse circling direction to the reflected circularly polarized light, and natural light having other wavelengths, are transmitted through the cholesteric liquid crystal layer.

The circling direction (rotating direction) of circularly polarized light to be reflected is selected by setting a spiral direction of the cholesteric liquid crystal layer. That is, when the long axes are seen from the incident direction of the light, by selecting either the spiral direction in which the molecular long axis of each layer orientation is clockwise or counterclockwise, the circling direction (rotating direction) of the circularly polarized light to be reflected is set.

The cholesteric liquid crystal exhibits an optical characteristic called "color shifting" in which color thereof varies with viewing angle. This is because the pitch P apparently decreases when the viewing angle increases, and the center wavelength λs shifts toward a shorter wavelength. For example, a cholesteric liquid crystal exhibits a reflected color in red when observed from a vertical direction, and the reflected color is observed to shift from red to orange, yellow, green, and blue in turn as the viewing angle increases. It should be noted that the viewing angle is defined as the angle formed by a visual line and a vertical line against the surface of the identifying medium.

Alternatively, instead of the cholesteric liquid crystal, a multilayer film formed by laminating light-transparent films having different refractive indexes at not less than several tens of layers may be used. In the multilayer film, light is reflected from each interface between the light-transparent films that are laminated, and the reflected light interferes, whereby the above-described color shifting is observed. Since the multilayer film exhibits color shifting, the multilayer film is called a "color shifting film" hereinafter.

The microcapsules may be spread under the optical functional layer, or the microcapsules may be dispersed into an appropriate binder so as to form a layer. The color of the adhesive layer is selected according to a combination with the pigments for developing color in the microcapsules. The microcapsules may be made of a material that is breakable by a predetermined degree of heating or cooling, or a material that is breakable by applying a predetermined degree of pressure. When it is anticipated that a large number of kinds of solvent may be used in improper acts, plural microcapsules, each of which develops color in accordance with the kind of solvent, may be used in a mixture.

The present invention provides an article to which the identifying medium according to the first aspect of the present invention is affixed by an adhesive layer. As the article, passports, bonds, important documents, various types of cards (credit cards, identification cards, and the like), various types of certifications, gift certificates, clothing items, commodities, storage media, electric appliances, machine components, electronic components, and other various products, may be exemplified. In addition, packages and packing materials for these articles may be exemplified as the article. Moreover, tags and price tags of products using the identifying medium of the present invention may be exemplified as the article.

The present invention also provides an identifying apparatus and a method for identifying the identifying medium having the above-described structure. That is, the present invention provides an identifying apparatus for an identifying medium, and the identifying apparatus includes an optical device for detecting the color change and includes a structure for detecting the color change which occurs by breaking microcapsules. According to the present invention, an apparatus that allows the detecting of signs of attempts to peel off an identifying medium by solvent is obtained. In addition, by detecting the color change and outputting a signal to indicate the detected result, an identifying method that allows the detecting of signs of attempts to peel off an identifying medium by solvent is obtained.

EFFECTS OF THE INVENTION

According to the present invention, when an identifying medium is being peeled off by dissolving an adhesive layer with solvent so as to decrease the adhesive function, microcapsules are dissolved by the solvent and are broken, whereby a predetermined color change occurs. Accordingly, the color of the identifying medium is changed, and signs of attempts to peel off the identifying medium are easily recognized. That is, according to the present invention, when an identifying medium is affixed to an article by an adhesive agent, a history of attempts to peel off the identifying medium by using organic solvent remains, and the history is easily recognized. Therefore, if an attempt is made to improperly reuse the identifying medium, it is extremely difficult to reuse the identifying medium while maintaining the prior condition. Accordingly, reuse of the identifying medium is prevented, and authenticity is reliably determined. When a cholesteric liquid crystal is used, a check of two steps using a visual inspection and using a viewer (circularly polarized light filter) can be performed, whereby identification is reliably performed.

REFERENCE NUMERALS

Figure 1:
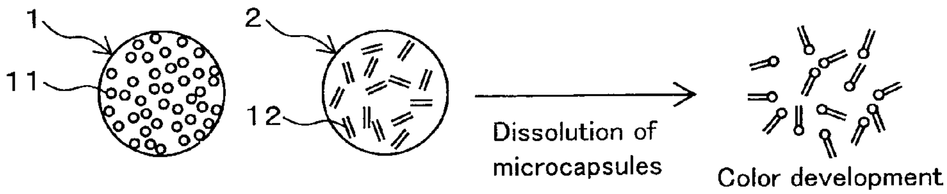
FIG. 1 is a schematic view for describing a function of microcapsules.

1 denotes a microcapsule (containing a dye), 2 denotes a microcapsule (containing a color-developing agent), 3 denotes an identifying medium, 4 denotes a hologram, 11 denotes dye, 12 denotes a color-developing agent, 21 denotes a base, 22 denotes a cholesteric liquid crystal layer, 23 denotes a transparent adhesive layer, 24 denotes a black adhesive layer, 25 denotes a colorless binder layer containing a color-developing agent, 26 denotes a penetrable transparent adhesive layer, 31 denotes a path (micropores) for solvent penetration, 32 denotes a microcapsule-containing layer, and 33 denotes a predetermined pattern.

BEST MODE FOR CARRYING OUT THE INVENTION

First Production Example of Microcapsules

First, a production example of microcapsules is described. In this case, a gelatin-acacia type material is used as a material for forming a microcapsule wall, and an example of forming microcapsules by a complex coacervation method is described.

First, each of a leuco dye dissolved in a nonvolatile oil and a color-developing agent is mixed with 50 g of 10% (W/V) gelatin solution and is stirred, whereby O/W type emulsions are obtained. As the leuco dye, for example, triphenyl methane type leuco dye; crystal violet lactone, may be mentioned, and the crystal violet lactone may be combined with a benzoyl leucomethylene blue in order to increase light resistance. As the nonvolatile oil, for example, oil of the alkyl naphthalene type or diallylalkane type may be used. As the color-developing agent, for example, phenols such as para-alkylphenol and para-allylphenol may be used. The emulsion is mixed with 50 g of 10% (W/V) acacia solution and is stirred for 10 minutes so as to obtain a mixture. After 230 ml of warm water at 40° C. is added to the mixture and is uniformly mixed together, 10% (V/V) acetic acid is dropped thereinto until the pH of the mixture is 4 to 4.3, whereby a sol of coacervate particles is formed. Next, the coacervate particles are cooled to 5° C. and are gelled while stirring, 1 ml of 50% (V/V) formalin is added thereto, and 10% (W/V) NaOH is dropped thereinto so that the pH is adjusted to be 9. Then, the gel is heated at 1° C./min and is maintained at 50° C. for a predetermined time. Thus, gelatin-acacia microcapsules are obtained. If a method disclosed in Japanese Patent Application Laid-Open No. 11-216354 is used, microcapsules are obtained without using formalin.

Second Production Example of Microcapsules

A lighter fluid in a Zippo is primarily made of naphtha and may decrease adhesive strength of an adhesive agent. Naphtha is a suitable solvent for natural rubber, and microcapsules having shells made of natural rubber are suitably used for detecting a lighter fluid in a Zippo. The microcapsules having the shells made of natural rubber may be formed by a coacervation method.

Hereinafter, a production example of these microcapsules is described. First, natural rubber is dissolved in benzene. Then, fine particles of leuco dye dispersed in water are stirred into the benzene containing the natural rubber. As a result, small particles of water containing the fine particles of the leuco dye are finely dispersed in the benzene, whereby dispersion is obtained. By adding methanol into the dispersion, the natural rubber is precipitated over the small particles of water containing the leuco dye, and microcapsules are formed. Microcapsules of a color-developing agent are also formed in the same manner.

When the formed microcapsules come into contact with a lighter fluid in a Zippo, the shells of the microcapsules are dissolved, and the leuco dye and the color-developing agent come out. The leuco dye dissolves in the lighter fluid in the Zippo and into a solution of the leuco dye. The solution of the leuco dye develops color when mixed with the color-developing agent.

Other Examples of Microcapsules

As a material for forming a microcapsule wall, for example, one kind selected from the group consisting of natural rubbers, acacia gum, rosins, ethyl celluloses, and polystyrenes may be used alone, or two or more kinds selected from the group may be used in a mixture. For example, microcapsules having shells made of polystyrene are soluble in a thinner primarily containing toluene. Microcapsules having shells made of natural rubber are soluble in a lighter fluid in a Zippo, which primarily contains solvent naphtha. Microcapsules having shells made of acacia gum are soluble in water.

Function of Microcapsules

FIG. 1 is a schematic view for describing a function of microcapsules. FIG. 1 shows a first microcapsule 1 containing a dye (for example, a leuco dye) 11 and shows a second microcapsule 2 containing a color former (for example, a color-developing agent) 12. When the walls of the microcapsule 1 and the microcapsule 2 are dissolved and are broken, for example, by a solvent, the dye 11 contained in the microcapsule 1 and the color former 12 contained in the microcapsule 2 come off and are mixed (i.e., they come into contact with each other), whereby color developing of a predetermined color occurs. If the outer walls of the microcapsule 1 and the microcapsule 2 are not broken, the dye 11 and the color former 12 are not mixed (i.e., they do not come into contact with each other), and the color developing does not occur.

(1) First Embodiment

Structure

Figure 2:
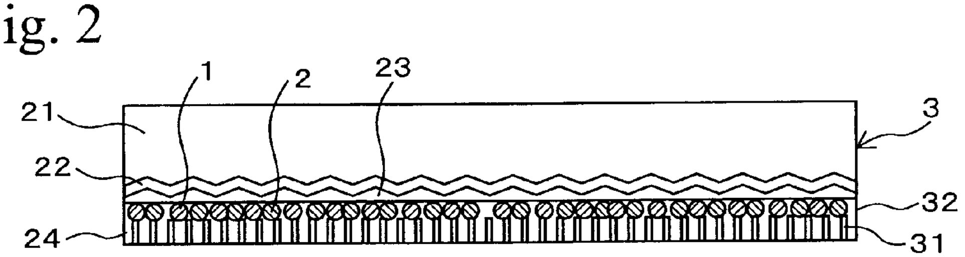
FIG. 2 is a sectional view showing an outline of an identifying medium.

FIG. 2 is a sectional view showing an outline of an identifying medium of the embodiment. FIG. 2 shows an identifying medium 3 in which a black adhesive layer 24, a transparent adhesive layer 23, a microcapsule-containing layer 32, a cholesteric liquid crystal layer 22, and a base 21, are laminated.

The black adhesive layer 24 is a layer of adhesive material mixed with black pigments such as carbon black, and the black adhesive layer 24 adheres the identifying medium 3 to an article and functions as a light absorption layer. The black adhesive layer 24 is provided with micropores 31 so that organic solvent can penetrate therethrough. The transparent adhesive layer 23 is used for fixing the microcapsules to the cholesteric liquid crystal layer 22 and is made of a transparent resin material. The microcapsule-containing layer 32 contains microcapsules 1 and microcapsules 2 and is formed by spreading the microcapsules 1 and 2 over the surface of the transparent adhesive layer 23. The microcapsule 1 contains a leuco dye, and the microcapsule 2 contains a color-developing agent for facilitating color development of the leuco dye. The cholesteric liquid crystal layer 22 is set to selectively reflect right-handed circularly polarized light in red and is subjected to an embossing to form a star-shaped hologram image. The base 21 is a thin plate made of a light transparent material, and a thin plate made of TAC (triacetyl cellulose) is used in this case.

Production Method

Hereinafter, an example of a production method for the identifying medium 3 shown in FIG. 2 is described. First, a base 21 made of TAC (triacetyl cellulose) having a thickness of 40 μm is prepared, and a polymer cholesteric liquid crystal, which reflects right-handed circularly polarized light in red at the front, is applied on the base 21 so as to form a cholesteric liquid layer 22. The cholesteric liquid crystal layer 22 is subjected to an embossing while applying heat and pressure by a hologram die, whereby a hologram figure (star marks) is formed.

Then, a commercially available transparent adhesive agent of acrylic type is applied on the exposed surface of the cholesteric liquid crystal layer 22, whereby a transparent adhesive layer 23 is formed. Before the transparent adhesive layer 23 is solidified, microcapsules produced by the above-described production example are uniformly spread over the exposed surface of the transparent adhesive layer 23, whereby the microcapsules are fixed thereto. Thus, a microcapsule-containing layer 32 is formed. In this case, as the microcapsules to be spread over, a mixture containing microcapsules 1 and containing microcapsules 2 at the same amount is used. The microcapsules 1 have shells made of polystyrene and contain a leuco dye, and the microcapsules 2 have shells made of polystyrene and contain a color-developing agent.

Next, a black adhesive layer 24 made of a black adhesive agent is formed on the exposed surface of the microcapsule-containing layer 32. The black adhesive layer 24 is formed by mixing black pigments and an adhesive agent and by forming into the shape of a sheet formed with plural micropores. In this case, the micropores are adjusted so as to have an average diameter of approximately 250 μm and have a formed density of approximately 400 pores/cm$^2$. It is suitable for the average diameter of the micropores to be within approximately 100 to 3000 μm. The formed density of the micropores may be several hundreds of pores/cm$^2$ as an approximate standard, and appropriate values are desirably experimentally measured.

Punching is performed by a die, whereby an identifying medium 3 is obtained in the form of a seal. In this case, if a release paper (not shown in the figure) is affixed to the exposed surface of the black adhesive layer 24, the identifying medium 3 is easy to use as a seal.

Function

Figure 3A:
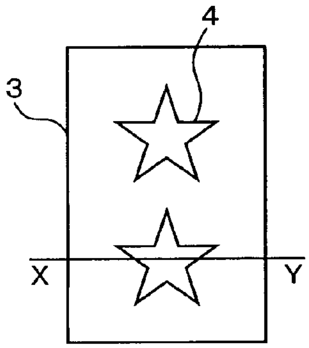
FIGS. 3A to 3C are schematic views for describing appearances of an identifying medium.
Figure 3B:
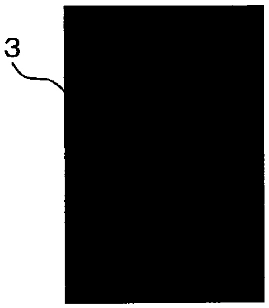
Figure 3C:
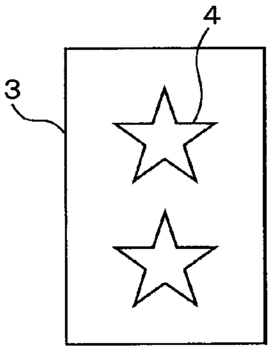

FIGS. 3A to 3C are schematic views showing appearances in identification. A cross sectional structure taken along line X-Y in FIG. 3A is shown in FIG. 2. In identifying the identifying medium 3 shown in FIG. 2, the identifying medium 3 is observed from the side of the base 21 made of TAC. Before the identifying medium 3 is immersed in organic solvent, light reflected from the cholesteric liquid crystal layer 22 is observed under ordinary viewing condition, and a figure of star holograms 4 in red with a metallic luster is observed as shown in FIG. 3A. When the identifying medium 3 is tilted so that the viewing angle is increased, color shifting of the cholesteric liquid crystal layer 22 occurs, and the appearance of the identifying medium 3 is changed (is color shifted) from red to green. The viewing angle is an angle formed between a visual line and a line perpendicular to the identifying medium. When the identifying medium 3 is viewed through a filter that transmits left-handed circularly polarized light, the light reflected from the cholesteric liquid crystal layer 22 is not observed, whereby the holograms 4 are not observed, and the identifying medium 3 appears to be black as shown in FIG. 3B. When the identifying medium 3 is viewed through a filter that transmits right-handed circularly polarized light, the figure of the holograms 4 in red is observed as shown in FIG. 3C.

Figure 4A:
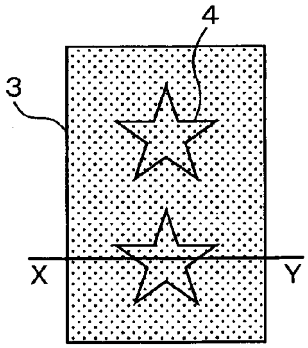
FIGS. 4A to 4C are schematic views for describing appearances of an identifying medium.
Figure 4B:
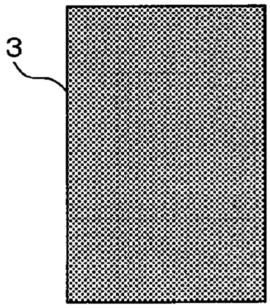
Figure 4C:
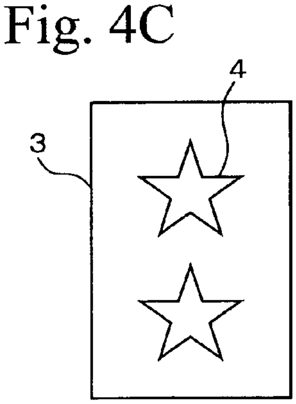

FIGS. 4A to 4C are schematic views showing appearances in identification. A cross sectional structure taken along line X-Y in FIG. 4A is shown in FIG. 2. When the identifying medium 3 in FIG. 2 is affixed to an article (for example, a piece of cardboard) and is immersed in organic solvent such as a thinner, the organic solvent penetrates through the micropores 31, which are paths for solvent penetration, into the microcapsule-containing layer 32. As a result, the shells of the microcapsules 1 and 2 are dissolved, and the leuco dye and the color-developing agent come out from the microcapsules and are mixed together, thereby developing color (they develop the color blue in this case). In this case, under ordinary viewing condition, the holograms 4 are observed in a background color in which red light reflected from the cholesteric liquid crystal layer 22 and blue light reflected from the microcapsule-containing layer 32 are mixed (FIG. 4A). When the identifying medium 3 is viewed through a filter that transmits left-handed circularly polarized light, the red light reflected from the cholesteric liquid crystal layer 22 is shut off, whereby the holograms 4 disappear, and the entire surface of the identifying medium 3 uniformly and clearly appears to be blue (FIG. 4B). When the identifying medium 3 is viewed through a filter that transmits right-handed circularly polarized light, the red light reflected from the cholesteric liquid crystal layer 22 is preferentially perceived, whereby the figure of the star holograms 4 in red with metallic luster is observed (FIG. 4C). In this case, in observing the identifying medium 3 by gradually separating the right-handed circularly polarized light filter from the seal, natural light entering into the identifying medium 3 from the outside except the filter increases, and the identifying medium 3 gradually appears to be blue which is reflected light of the natural light.

As described above, if the identifying medium 3 is being peeled off from the article using solvent, the color condition is changed, whereby signs of attempts to peel off can be recognized later. In other words, signs, by which a proper identifying function cannot be further obtained, are clearly identified. Therefore, improper reuse of the identifying medium 3 is easily identified, and the improper reuse of the identifying medium 3 is thereby prevented.

(2) Second Embodiment

Structure

Figure 5:
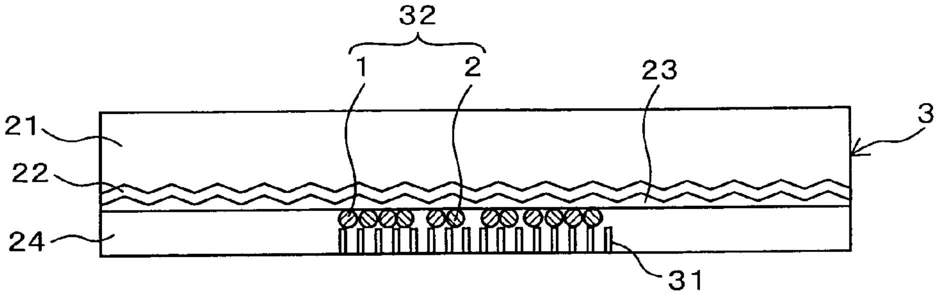
FIG. 5 is a sectional view showing an outline of an identifying medium.

FIG. 5 is a sectional view showing other structure of an identifying medium using the present invention. FIG. 5 shows an identifying medium 3, basically having the same structure as that of the identifying medium 3 shown in FIG. 2. The identifying medium 3 has a different structure from the structure shown in FIG. 2 in that the identifying medium 3 is partially provided with a microcapsule-containing layer 32 forming a figure or a character (in this example, characters "OK").

Function

The appearance of this identifying medium 3 is similar to that in the first embodiment before this identifying medium 3 is immersed in organic solvent. In this case, since the thicknesses of the microcapsules are small, differences in thickness between the portions with the microcapsules and the portions without the microcapsules are not observed.

Figure 6A:
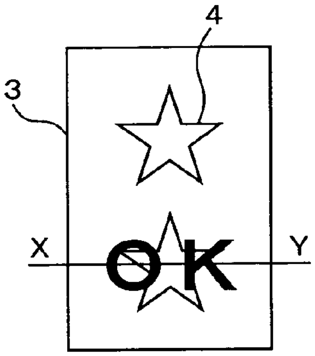
FIGS. 6A to 6C are schematic views for describing appearances of an identifying medium.
Figure 6B:
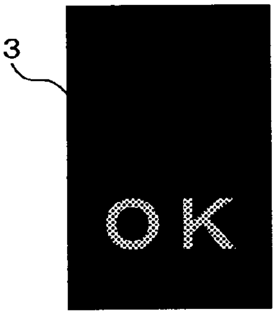
Figure 6C:
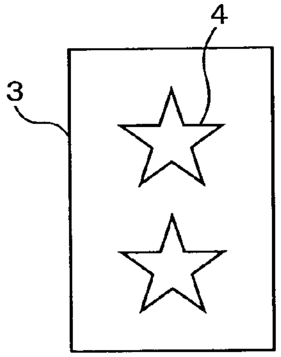

A case of observing this identifying medium 3 after this identifying medium 3 is immersed in organic solvent is described. FIGS. 6A to 6C are schematic views showing appearances in identification. A cross sectional structure taken along line X-Y in FIG. 6A is shown in FIG. 5. When the identifying medium 3 in FIG. 5 is observed under ordinary viewing conditions after the identifying medium 3 is immersed in organic solvent, holograms 4 are observed, and the characters "OK" in blue are faintly observed (FIG. 6A). When the identifying medium 3 in FIG. 5 is viewed through a left-handed circularly polarized light filter, the characters "OK" in blue clearly emerge on a black background (FIG. 6B). When the identifying medium 3 in FIG. 5 is viewed through a right-handed circularly polarized light filter, only the holograms 4 are observed (FIG. 6C). In observing this identifying medium 3 by gradually separating the right-handed circularly polarized light filter from the seal in the same manner as in the first embodiment, the characters "OK" in blue gradually emerge.

That is, if the identifying medium 3 shown in FIG. 5 is affixed to an article and an attempts is made to peel off using an organic solvent, the characters "OK" in blue emerge as shown in FIG. 6A, and the signs of attempts to peel off the identifying medium 3 using an organic solvent can be recognized in later observations.

(3) Third Embodiment

Structure

Figure 7:
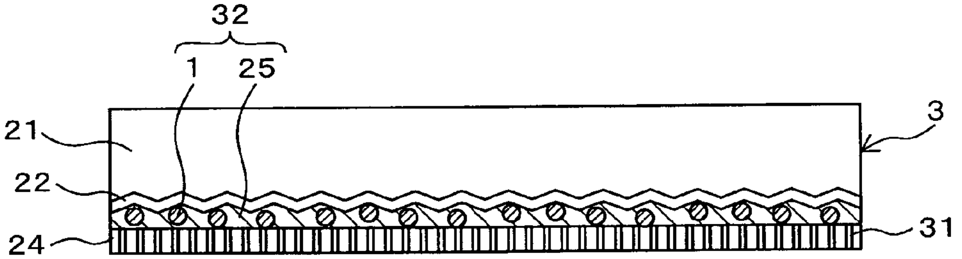
FIG. 7 is a sectional view showing an outline of an identifying medium.

FIG. 7 is a sectional view showing other structure of an identifying medium using the present invention. FIG. 7 shows an identifying medium 3, basically having the same structure as that of the identifying medium 3 shown in FIG. 2, but this identifying medium 3 has a different microcapsule-containing layer.

FIG. 7 shows a microcapsule-containing layer 32 in which microcapsules 1 containing a leuco dye are dispersed in a colorless binder layer 25 containing a color-developing agent. The microcapsules 1 containing a leuco dye are dispersed into the transparent binder that uniformly contains a color-developing agent, and they are applied to a cholesteric liquid crystal layer 22, whereby the microcapsule-containing layer 32 is formed. In this case, the application may be partially performed. Alternatively, the color-developing agent may be contained in the microcapsules, and the leuco dye may be contained in the binder.

Function

The identifying medium 3 shown in FIG. 7, in which organic solvent penetrates, has an appearance similar to that in the first embodiment. When organic solvent penetrates the identifying medium 3 shown in FIG. 7, the shells of the microcapsules contacting the black adhesive layer 24 are dissolved, and the leuco dye in the microcapsules contacts the color-developing agent in the binder, whereby color is developed.

(4) Fourth Embodiment

Figure 8:
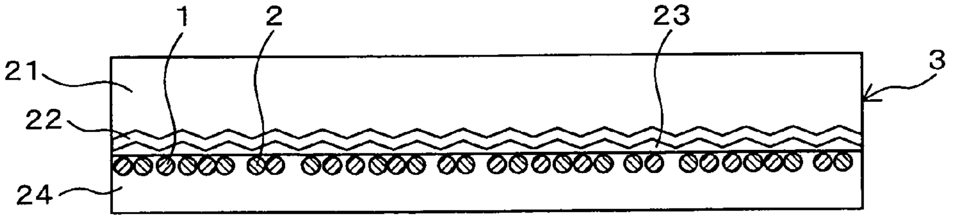
FIG. 8 is a sectional view showing an outline of an identifying medium.

If the black adhesive layer in the first to the third embodiments is changed to an adhesive layer that allows organic solvent to pass, the black adhesive layer may not be provided with the micropores. A cross section of an example is shown in FIG. 8, and in this example, the black adhesive layer in the first embodiment is changed to a black adhesive layer that does not have micropores and transmits organic solvent. As a material for forming a black adhesive layer that allows organic solvent to pass, an acrylic adhesive agent mixed with black pigments may be mentioned.

(5) Fifth Embodiment

Figure 9:
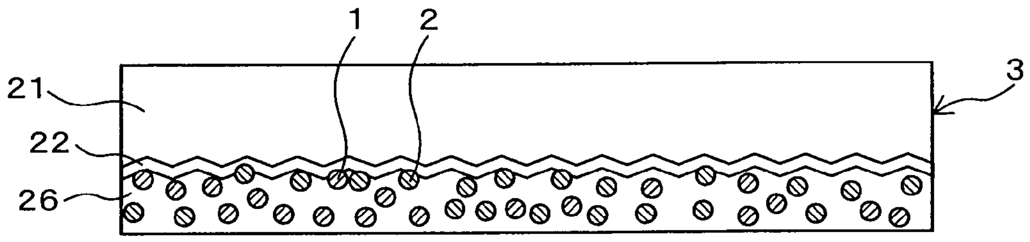
FIG. 9 is a sectional view showing an outline of an identifying medium.

By using a penetrable transparent adhesive agent, the microcapsules will not be spread under the cholesteric liquid crystal layer 22 and will be dispersed into the adhesive layer. A cross section of this example is shown in FIG. 9. FIG. 9 shows an example of a structure in which microcapsules 1 and 2 are dispersed into a transparent adhesive layer 26.

In the structure shown in FIG. 9, one of a leuco dye and a color-developing agent may be covered in microcapsules, and the other may be dispersed into the adhesive layer 26. In forming this adhesive layer, a solvent that does not dissolve the microcapsules must be used.

(6) Sixth Embodiment

A color shifting film may be used instead of the cholesteric liquid crystal. In this case, when the microcapsules develop color, not only interfering light by the color shifting film, but also light reflected from a color changed portion generated by the breakage of the microcapsules, is observed. Therefore, the color changed portion clearly appears to be blue that is generated by the leuco dye, compared to the color of the other portion. Since light reflected from the microcapsule-containing layer is observed at the color changed portion, color shifting effect is not easily recognized at the color changed portion when the seal is tilted. Accordingly, the color changed portion of the microcapsules can be recognized separately from the other portion, whereby a high identifying function is obtained.

An example of a color shifting film is described hereinafter. As a color shifting film, a film formed by alternately laminating light-transparent films having different refractive indexes may be used. For example, first thin films made of polyethylene-2,6-naphthalate and second thin films made of copolyethylene terephthalate are alternately laminated so that the number of the layers is approximately 200, and the layers are stretched, whereby a color shifting film is obtained.

The color shifting film may be subjected to an embossing so as to form a hologram. In this case, identification is performed by using an image of the hologram in addition to the above-described optical characteristics of the color shifting effect.

(7) Seventh Embodiment

Figure 10:
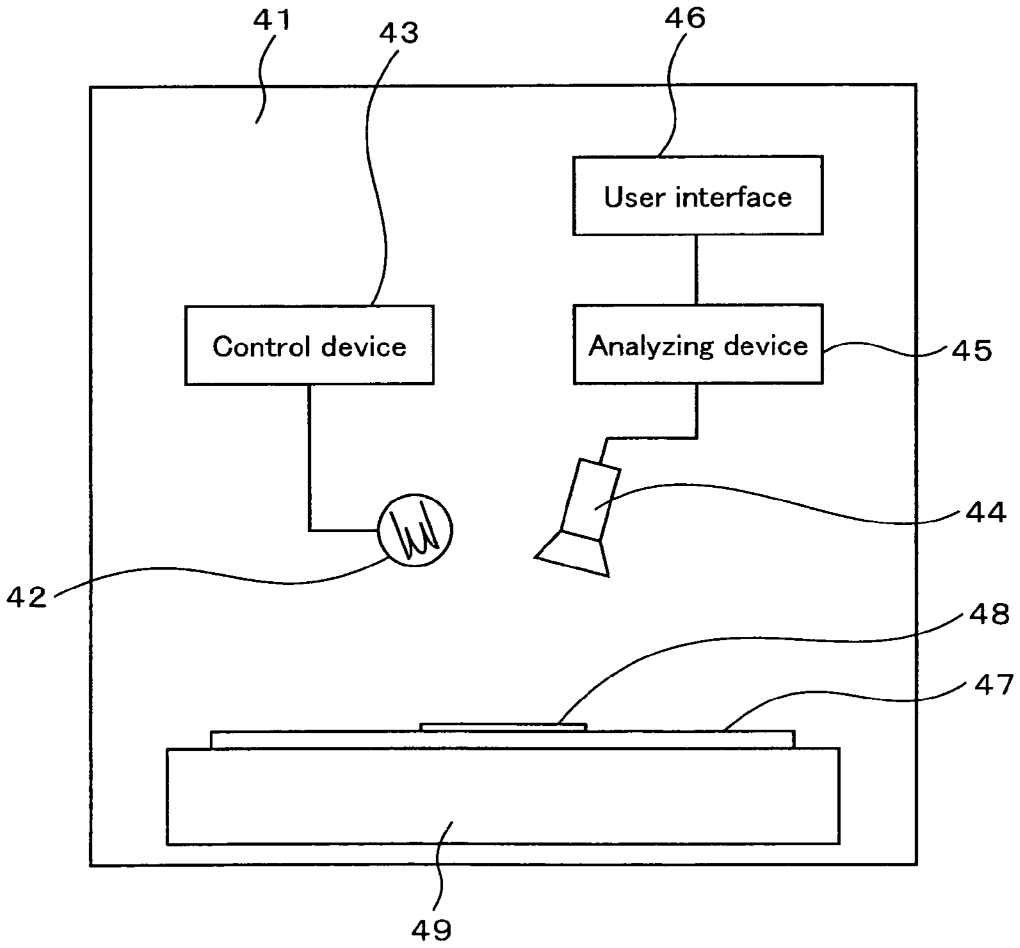
FIG. 10 is a schematic view showing an outline of an identifying apparatus.

Hereinafter, an example of an identifying apparatus for an identifying medium using the present invention and an example of an identifying method using the identifying apparatus are described. FIG. 10 is a schematic view showing an example of an identifying apparatus. FIG. 10 shows an identifying apparatus 41 having a stage 49 for placing an article 47 to be identified. In this case, the article 47 may be one of various types of cards and identifications, for example. An identifying medium 48 using the present invention is affixed to the article 47.

The identifying apparatus 41 has a white lamp 42 for irradiating the identifying medium 48 with white light and has a control device 43 for switching the white lamp 42. The identifying apparatus 41 also has a CCD camera 44 for photographing the identifying medium 48 and has an analyzing device 45 for analyzing an image photographed by the CCD camera 44 and detecting a sign of a predetermined color change. The analyzing device 45 outputs an analyzed result to a user interface 46. The user interface 46 includes an operating device for operating the analyzing device 41 and includes an indicating device for indicating the analyzed result (for example, a liquid crystal display).

The analyzing device 45 detects color change, which occurs by breakage of microcapsules. Specifically, a standard image is preliminarily stored in a memory (not shown in the figure), and a photographed image of the identifying medium 48 and the standard image are compared. Then, identity of the image of the identifying medium 48 is analyzed by comparing with a predetermined standard. When the image of the identifying medium 48 is determined to be nonidentity, a signal of this analyzed result is output from the analyzing device 45 to the user interface 46. By receiving this signal, the user interface 46 displays an indication that the identifying medium 48 is a misused material, on the indicating device.

The identifying apparatus 41 also includes a right-handed circularly polarized light filter, a left-handed circularly polarized light filter, a driving device for taking these filters in and out from an optical axis, and a driving device for tilting the stage 42 (which are not shown in the figure). The identification described in the embodiments is performed by image analysis using these pieces of hardware and the above-described analyzing structure.

(8) Eighth Embodiment

Figure 11:
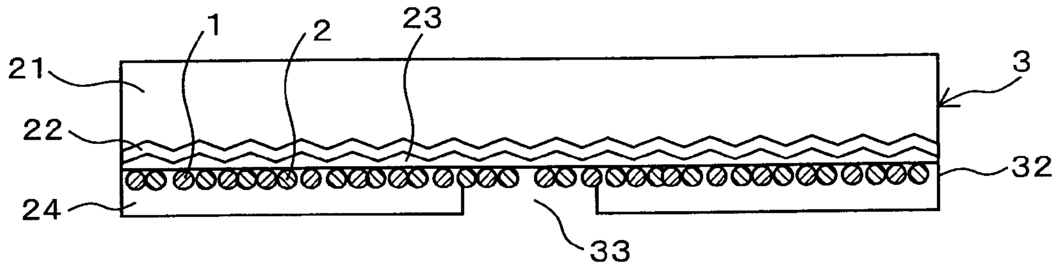
FIG. 11 is a sectional view showing an outline of an identifying medium.

FIG. 11 is a sectional view showing an outline of a cross sectional structure of other embodiment of the present invention. In this example, a black adhesive layer without micropores is used for the black adhesive layer 24 in the structure of the first embodiment shown in FIG. 2. A portion 33 of the black adhesive layer 24 is patterned by exposing the microcapsule-containing layer 32 thereat and by forming a predetermined pattern (for example, a character or a figure). A dye which appears to be black in developing color is contained in the microcapsules 1, and a color-developing agent therefor is contained in the microcapsules 2. The combination of a dye and a color-developing agent is selected so that the dye and the color-developing agent are transparent when they are not mixed, and so that the dye and the color-developing agent develop the color black when they are mixed.

Figure 12A:
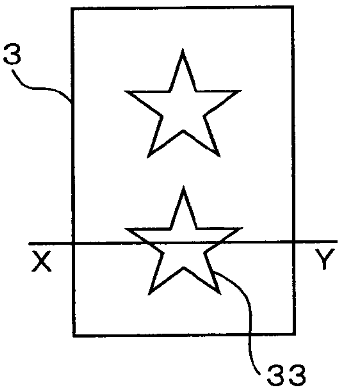
FIGS. 12A and 12B are schematic views for describing appearances of an identifying medium.
Figure 12B:
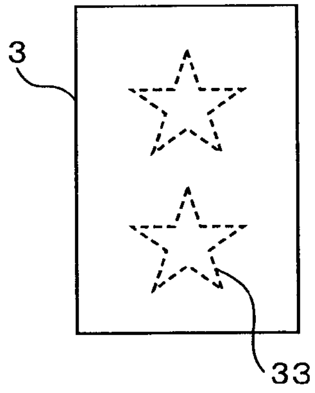

FIGS. 12A and 12B are schematic views for describing appearances of the identifying medium 3 in this embodiment. A cross sectional structure taken along line X-Y in FIG. 12A is shown in FIG. 11. Hereinafter, an example of a case of directly observing the identifying medium 3 is described. The identifying medium 3 is affixed to an appropriate article having a surface that is not black. In this case, when the identifying medium 3 is directly observed, the surface of the article is observed at the portion of the pattern 33, and the pattern 33 (star marks in this case) is recognized (FIG. 12A).

If the identifying medium 3 is peeled off using a solvent, the microcapsule-containing layer 32 is exposed at the portion of the predetermined pattern 33, and the solvent penetrates from the portion into the microcapsule-containing layer 32. As a result, the microcapsules 1 and 2 contact the solvent and are broken, whereby the dye and the color-developing agent are mixed and develop the color black. Therefore, the entirety of the background of the cholesteric liquid crystal layer 23 appears to be black, whereby the surface of the article cannot be observed at the portion of the pattern 33, and the above-described pattern 33 is not recognized (or is not easily recognized) (FIG. 12B). According to this structure, improper reuse of the identifying medium 3 may be identified by the emergence of the pattern 33. Identification using this function can also be performed in observation through a circularly polarized light filter.

In this example, the portion of the predetermined pattern 33 functions as a path for liquid penetration. The portion of the predetermined pattern 33 may be formed into a mesh structure having plural holes or a lattice structure having plural long and thin openings, instead of a pattern formed by completely removing the black adhesive layer 24. In this case, a figure made by the pattern of the mesh structure or the pattern of the lattice structure may be used for identification.

(9) Ninth Embodiment

In the eighth embodiment, another combination of a dye and a color-developing agent may be selected. The dye and the color-developing agent are black in an ordinary state, and the dye and the color-developing agent become transparent when microcapsules are broken and the dye and the color-developing agent are mixed (are reacted). This case is opposite to the case in the eighth embodiment, and the pattern 33 is not observed (or is not easily observed) as shown in FIG. 12B when an ordinary state. When the microcapsules are broken, the pattern 33 is clearly recognized as shown in FIG. 12A.

(10) Tenth Embodiment

In the second embodiment shown in FIG. 5, another combination of a dye and a color-developing agent is used for the microcapsules 1 and 2 contained in the microcapsule-containing layer 32. The dye and the color-developing agent are white in an ordinary state, and the dye and the color-developing agent appear to be black when the microcapsules are broken and the dye and the color-developing agent are mixed (are reacted).

In this case, in direct observation or observation through a circularly polarized light filter, the pattern of the microcapsule-containing layer 32 is observed. When the microcapsules are broken, since the pattern of the microcapsule-containing layer 32 appears to be the same color as that of the black adhesive layer 24, the pattern of the microcapsule-containing layer 32 cannot be observed (or is not easily observed).

In the second embodiment shown in FIG. 5, another combination of a dye and a color-developing agent may be used for the microcapsules 1 and the microcapsules 2 contained in the microcapsule-containing layer 32. The dye and the color-developing agent are black in an ordinary state, and the dye and the color-developing agent appear to be white when the microcapsules are broken and the dye and the color-developing agent are mixed (are reacted).

In this case, in direct observation or observation through a circularly polarized light filter, the pattern of the microcapsule-containing layer 32 is not observed (or is not easily observed). When the microcapsules are broken, the color of the pattern of the microcapsule-containing layer 32 is changed to white, whereby the pattern of the microcapsule-containing layer 32 is perceived by eye.

(11) Eleventh Embodiment

In the eighth to the tenth embodiments, a color shifting film may be used instead of the cholesteric liquid crystal layer 22. The color shifting film is formed by laminating light-transparent films so that adjacent light-transparent films have different refractive indexes. In this case, color change of a portion that exhibits color shifting is observed in addition to the predetermined pattern, and breakage (that is, improper reuse) of the microcapsules is identified by emergence and clearness of the color changed portion.

INDUSTRIAL APPLICABILITY

The present invention may be used for identifying mediums in which authenticity thereof are determined by visual inspection or by image processing.

The invention claimed is:

1. An identifying medium comprising:

an optical functional layer that is optically identifiable; and a layer containing microcapsules, wherein the microcapsule contains a material that occurs color change by breaking the microcapsule.

2. The identifying medium according to claim 1, wherein the identifying medium comprises an adhesive layer, and the microcapsule is made of a material that is soluble by solvent which dissolves the adhesive layer or decreases adhesive strength of the adhesive layer.

3. The identifying medium according to claim 2, wherein the layer containing the microcapsules is provided adjacent to the adhesive layer, and the adhesive layer has an adhesive surface and is formed with a path for liquid penetration from the adhesive surface to the layer containing the microcapsules.

4. An article to which the identifying medium recited in claim 2 is affixed by the adhesive layer.

5. The identifying medium according to claim 1, wherein the microcapsules include first microcapsules containing a first raw material and include second microcapsules containing a second raw material, and the color change occurs by mixing the first and the second raw materials.

6. The identifying medium according to claim 1, wherein the optical functional layer is made of a cholesteric liquid crystal layer or a multilayer film having plural light-transparent films which are laminated so that adjacent light-transparent films have different refractive indexes.

7. An identifying apparatus for identifying the identifying medium recited in claim 1, the identifying apparatus comprising an optical detecting device for detecting the color change.

8. An identifying method for identifying the identifying medium recited in claim 1, the method comprising:

a step for detecting the color change; and a step for outputting a signal of detection of the color change.

* * * * *